United States Patent
Markunas

(10) Patent No.: US 9,374,027 B2
(45) Date of Patent: Jun. 21, 2016

(54) SENSORLESS ROTOR POSITION DETERMINATION FOR A WOUND FIELD SYNCHRONOUS MACHINE

(75) Inventor: Albert L. Markunas, Roscoe, IL (US)

(73) Assignee: HAMILTON SUNDSTRAND CORPORATION, Windsor Locks, CT (US)

( * ) Notice: Subject to any disclaimer, the term of this patent is extended or adjusted under 35 U.S.C. 154(b) by 0 days.

(21) Appl. No.: 13/361,520

(22) Filed: Jan. 30, 2012

(65) Prior Publication Data
US 2013/0193888 A1  Aug. 1, 2013

(51) Int. Cl.
   H02P 6/18  (2006.01)
   H02P 6/16  (2006.01)
   H02P 23/03 (2006.01)

(52) U.S. Cl.
   CPC .................................. H02P 6/18 (2013.01)

(58) Field of Classification Search
   CPC ........................................................ H02P 6/18
   USPC ............. 318/400.37, 400.01, 400.02, 400.32, 318/400.42, 700, 722, 254
   See application file for complete search history.

(56) References Cited

U.S. PATENT DOCUMENTS 7,034,497 B2 * 4/2006 Markunas et al. ........ 318/400.33
7,132,816 B1 * 11/2006 Markunas ............... H02P 21/00
                                                        318/400.02
2008/0315822 A1 * 12/2008 Maddali ..................... H02P 6/18
                                                        318/700
2009/0174188 A1 * 7/2009 Huang ..................... F02N 11/04
                                                        290/46
2012/0062161 A1 * 3/2012 Patel ........................ H02P 6/18
                                                        318/400.33

OTHER PUBLICATIONS

Leidhold, R.; Mutschler, P., "Sensorless position detection in PM synchronous motors by injecting a high-frequency zero-sequence carrier," Power Electronics and Applications, 2009. EPE '09. 13th European Conference on , vol., No., pp. 1,10, Sep. 8-10, 2009 URL: http://ieeexplore.ieee.org/stamp/stamp.jsp?tp=&arnumber=5278973&isnumber=5278662.*

(Continued)

*Primary Examiner* — Paul Ip
*Assistant Examiner* — Said Bouziane
(74) *Attorney, Agent, or Firm* — Cantor Colburn LLP

(57) ABSTRACT

A rotor position determination and tracking system for a dynamo electric machine includes a first AC power supply to inject a carrier wave into a main stator of the dynamoelectric machine and a second AC power supply to inject an excitation voltage or current into an exciter stator of the dynamoelectric machine. A plurality of current sensors and voltage sensors located at the exciter input lines sense current and voltage thereat. A first control logic receives the sensed current and voltage and outputs an estimated rotor position. A second control logic receives an estimated exciter field voltage or current rotating wave form angle and filtered sensed current or voltage signals from the first control logic and utilizes a known main stator carrier frequency to determine the rotor position. The rotor position is input into the first control logic to calibrate the first control logic for tracking of the true rotor position.

18 Claims, 2 Drawing Sheets

(56) References Cited

OTHER PUBLICATIONS

Leidhold, R.; Mutschler, P., "Sensorless position detection in PM synchronous motors by injecting a high-frequency zero-sequence carrier," Power Electronics and Applications, 2009. EPE '09. 13th European Conference on , vol., No., pp. 1,10, Sep. 8-10, 2009.*

Kayikci, E.; Lorenz, R.D., "Self-sensing control of a four phase switched reluctance drive using high frequency signal injection including saturation effects," Electric Machines and Drives Conference, 2009. IEMDC '09. IEEE International , vol., No., pp. 611,618, May 3-6, 2009.*

* cited by examiner

US 9,374,027 B2

SENSORLESS ROTOR POSITION DETERMINATION FOR A WOUND FIELD SYNCHRONOUS MACHINE

BACKGROUND OF THE INVENTION

The subject matter disclosed herein relates to dynamoelectric machines. More specifically, the subject matter disclosed herein relates to rotor position determination for wound field synchronous machines.

A multi-phase alternating current (AC) dynamoelectric machine can be used as a motor or as a generator. In aircraft applications in particular, it is desirable to use such a machine for both electrical power generation and as a starter motor to promote weight and space savings on the aircraft. When used as a starter, the position of the rotor of the dynamoelectric machine must be determined in order to properly orient the stator current rotating 3-phase waveform relative to the magnetic north pole of the rotor. Orienting the stator current waveform relative to the rotor position is necessary for motor operation and proper orientation results in an optimum amount of torque being produced by the dynamoelectric machine.

Since a mechanical rotor position sensor can be costly and lacking in reliability, it is desired to determine the rotor position without the use of such a mechanical position sensor. In general, there are two categories of sensorless rotor position determinations. The first is a back EMF based method, which is relatively easy to implement and usually works well at high angular rotor velocity, but is less reliable at low rotor velocity and doesn't work at all below some threshold speed or at standstill. The second is a signal injection method, which is required below some threshold angular rotor velocity or at standstill. Systems that utilize the signal injection method, however, are subject to a rotor position error of up to 180 degrees because the system cannot recognize which of a number of possible rotor positions it has locked on to or is tracking.

A carrier injection sensorless (CIS) logic has been developed which successfully determines which of the possible rotor positions that the system is tracking providing an absolute or true rotor position. The determination of true rotor position involves two separate CIS logic blocks, the first of which interrogates the exciter stator to lock on to and track the rotor position by measuring and demodulating the current harmonics contained in the 3-phase exciter of the machine and the second which interrogates the main machine through its stator to determine which of the possible rotor positions the exciter based CIS logic block has locked on to and is tracking. This result is used to calibrate the first logic block to provide a true or absolute rotor position. The second CIS logic block has inherent north/south pole indeterminacy and determines main machine positive from negative poles by, for example, saturating the main machine rotor or using the rectification in the rotating rectifier of the machine in a secondary logic. Thus, both techniques require a two-step process whereby the primary CIS logic block locks on to a preferred position as in the exciter CIS or to a pole as in the main machine stator CIS, and the secondary CIS logic block determines which of the possible rotor positions the primary CIS has locked on to thereby providing a correction or calibration to the primary CIS logic block. The double two-step process requires significant logic complexity. Further, using rectification to provide the secondary current harmonic increases the electrical stress on the rotating rectifier diodes thereby reducing their reliability. Additionally, the main stator carrier currents required to induce saturation in the main machine may be so large at to significantly upsize the current sourcing requirements of the main machine AC power supply.

BRIEF DESCRIPTION OF THE INVENTION

In one embodiment, a rotor position determination and tracking system for a dynamoelectric machine includes a first AC power supply to inject a main stator stimulus into a main stator of the dynamoelectric machine. A second AC power supply injects an exciter stator stimulus into an exciter stator of the dynamoelectric machine via a plurality of exciter input lines. A plurality of current sensors and voltage sensors are located at the exciter input lines to sense current and voltage thereat. A first control logic receives the sensed current and voltage and outputs an estimated rotor position. A second control logic receives an estimated exciter stator stimulus rotating wave form angle and filtered sensed exciter stator response signals from the first control logic and utilizes a known main stator carrier frequency to determine the rotor position. The rotor position is input into the first control logic to calibrate the first control logic for further tracking of the rotor position.

In another embodiment, a method of rotor position determination and tracking for a dynamoelectric machine includes injecting a main stator stimulus into a main stator of the dynamoelectric machine and injecting an exciter stator stimulus into an exciter stator of the dynamoelectric machine via a plurality of exciter input lines. An exciter current and an exciter voltage are sensed via a plurality of current sensors and voltage sensors disposed at the exciter input lines. An estimated rotor position is determined via a first control logic utilizing the sensed exciter current and exciter voltage. A rotor position is determined via a second control logic utilizing an estimated exciter stator stimulus rotating wave form angle and filtered exciter stator response signals from the first control logic together with a known main stator carrier frequency. The rotor position is input into the first control logic to calibrate the first control logic for further tracking of the rotor position.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
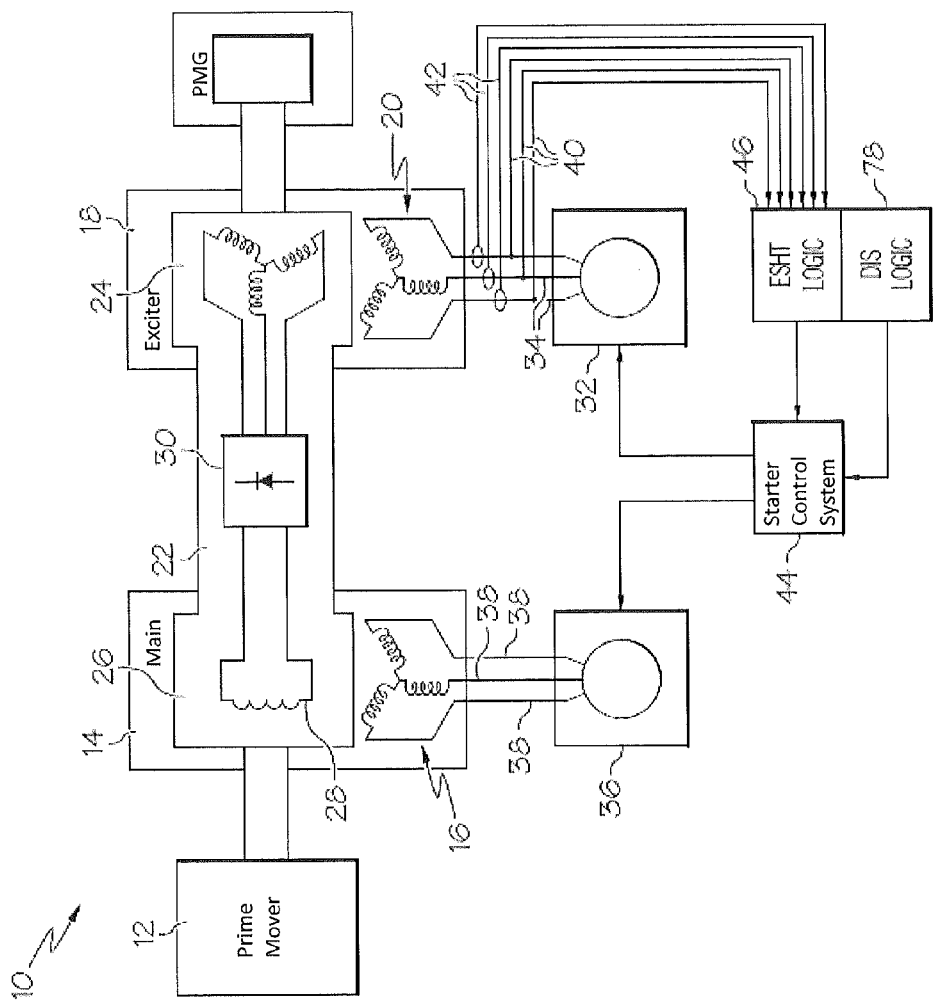
FIG. 1 is a schematic of an embodiment of a starter generator.

Shown in FIG. 1 is a schematic of a dynamoelectric machine, in this case a starter generator 10, connected to a prime mover, for example, an aircraft engine 12. The starter generator 10 is of a brushless wound field type including a main machine 14 having a main stator 16. The main stator 16 of FIG. 1 is a three-phase alternating current (AC) stator, but it is to be appreciated that the main stator 16 may have other numbers of phases which number two or more. The starter generator 10 further includes an exciter portion 18 having an exciter stator 20. The exciter stator 20 of FIG. 1 is a three-phase alternating current (AC) stator, but it is to be appreciated that the exciter stator 20 may have other numbers of phases which number two or more. The starter generator 10 further includes a generator rotor 22 which includes a multiphase AC exciter armature 24 interactive with the exciter stator 20 and a main machine rotor 26 interactive with the main stator 16. The main machine rotor 26 includes a direct current (DC) field winding 28, and is connected to the exciter armature 24 via a rectifier 30, which rectifies AC current induced in the exciter armature 24 to supply DC that energizes the main rotor field winding 28. The rectifier 30 may be a full or half-wave rectifier 30. An AC power source 32 supplies an AC excitation to the exciter stator 20 via exciter input lines 34. The AC power source 32 may be an inverter, AC power from an aircraft AC power bus, or any other suitable source of AC power. Similarly, a main inverter 36 supplies an AC drive signal to the main stator 16 via main input lines 38.

The position of the generator rotor 22 is determined and tracked via a double injection sensorless (DIS) logic described herein, using both injection of a main stator stimulus, into the main stator 16 in the form of either voltage or current, and injection of an exciter stator stimulus, into the exciter stator 20 in the form of either voltage or current. The exciter stator stimulus is injected into or applied to the exciter stator 20 at the initiation of the start sequence from the AC power source 32 to generate a field to initiate rotation of the generator rotor 22. This injection of the exciter stator stimulus is initiated by a starter control system 44. The starter control system 44, in the first few instants of the start sequence, directs the main inverter 36 to similarly inject the main stator stimulus, a carrier voltage or current, into the main stator 16. The main stator stimulus applied is not great enough to power the main rotor 26, but only to be utilized to determine the true or absolute position of the generator rotor 22.

Figure 2:
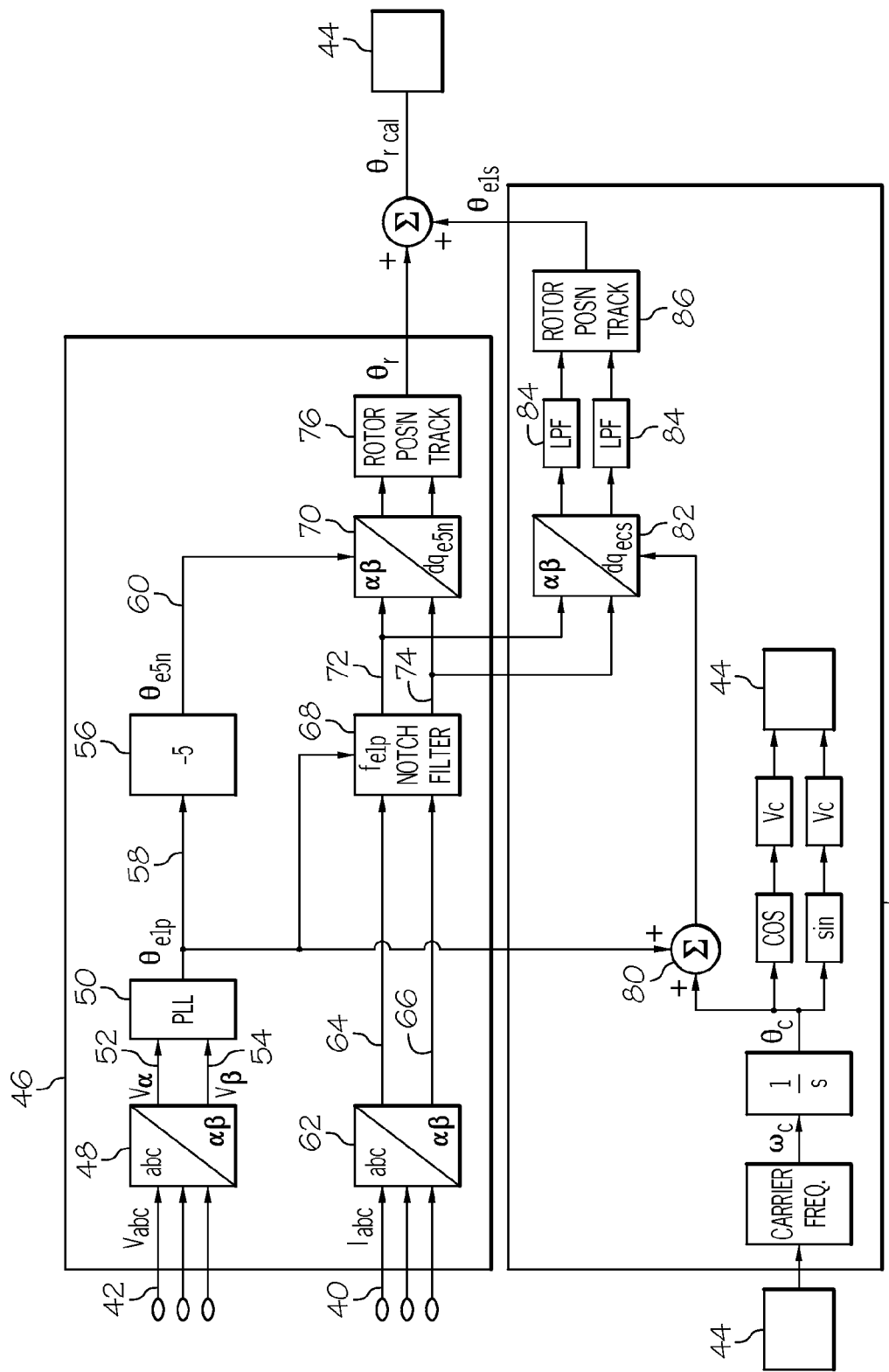
FIG. 2 is a schematic of an embodiment of a system for determining and tracking position of a rotor.

A three-phase exciter stator response, $R_{Eabc}$, and a three phase exciter stator stimulus, $S_{Eabc}$, are sensed by sensors 40 and 42 respectively, at the exciter input lines 34 and include response harmonics related to the main stator stimulus applied to the main stator 16. Referring now to FIG. 2, $R_{Eabc}$ and $S_{Eabc}$ are input into an exciter stator harmonic tracking (ESHT) logic 46. A Clark transformation 48 receives the sensed exciter stator stimulus, $S_{Eabc}$, and transforms it into $S_{E\alpha}$ and $S_{E\beta}$. A phase lock loop (PLL) 50 receives $S_{E\alpha}$ and $S_{E\beta}$ on signal lines 52 and 54, and outputs an estimated exciter stator stimulus rotating waveform angle, $\theta_{elp}$. A harmonic multiplier 56, tuned to the $-5^{th}$ harmonic of the exciter frequency, receives the $\theta_{elp}$ signal on signal path 58 and outputs the $-5^{th}$ harmonic of $\theta_{elp}$, or $\theta_{e5n}$, along signal path 60.

The three-phase exciter stator response, $R_{Eabc}$, is transformed via a Clarke transformation 62 into $\alpha$-axis and $\beta$-axis signals, $R_{E\alpha}$ and $R_{E\beta}$ and outputs the signals along signal paths 64 and 66. $\theta_{elp}$ and $R_{E\alpha}$ and $R_{E\beta}$ are input into an $f_{elp}$ notch filter 68, for example, to filter out exciter fundamental frequency response harmonics. A Park transformation 70 receives the filtered $R_{E\alpha}$ and $R_{E\beta}$ via signal paths 72 and 74 and using the angle of the $-5^{th}$ harmonic of the exciter stator stimulus, $\theta_{e5n}$, transforms $R_{E\alpha}$ and $R_{E\beta}$ into a d-axis signal $R_{Ede5n}$ and a q-axis signal $R_{Eqe5n}$, where the d-q reference frame is a rotating reference frame for the exciter space vector harmonic which rotates at the $-5^{th}$ harmonic of the exciter stator stimulus. $R_{Ede5n}$ and $R_{Eqe5n}$ are utilized in an estimation of rotor position, $\theta_r$, via, for example a PLL 76.

The main stator stimulus, applied to the main stator 16 is provided by a double injection sensorless (DIS) calibration logic 78. The DIS logic 78 uses the main stator stimulus angle $\theta_c$ and adds $\theta_c$ to $\theta_{elp}$ at an input summer 80. This summed angle, $\theta_{c+elp}$, is utilized as a transformation angle to transform post-notch filter $R_{E\alpha}$ and $R_{E\beta}$ to $R_{Edecs}$ and $R_{Eqecs}$, at Park transformation 82, the transformation resulting in responses that contain true or actual rotor angle information. $R_{Edecs}$ and $R_{Eqecs}$ are filtered to remove unwanted high frequency harmonic content by being passed through a low pass filter 84, for example. The resulting signals are utilized to estimate the true rotor position of the main machine at estimation block 86. The estimation may comprise using an arctan function, a rotating vector PLL, a rotor position estimator, or any number of other techniques known in the art.

During initial position estimation of the starter generator rotor 22, the ESHT logic 46 determines one of several possible positions of the starter generator rotor 22. The estimated rotor position output by the ESHT logic 46, or $\theta_r$, is offset by some angular amount from the true position of the starter generator rotor 22. The true position of the starter generator rotor 22 determined by the DIS logic 78, or $\theta_{DIS}$, is used in combination with $\theta_r$ to calibrate the ESHT logic 46 via a calibration routine. A calibration offset, $\theta_{real}$, is then fed back into the starter control system 44 for continued use by the ESHT logic 46 throughout the start sequence. At this point, operation of the DIS logic 78 is stopped. It is to be appreciated that the DIS logic 78 and the ESHT logic 46, as well as other calculations described herein may be implemented via processing circuitry, firmware such as Field Programmable Gate Arrays (FPGA), or software for digital signal processor (DSP).

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:
1. A dynamoelectric machine comprising:
a main stator;
a main machine rotor interactive with the main stator;
an exciter armature operably connected to the main machnine rotor via a generator rotor including a rectifier;
an exciter stator interactive with the exciter armature; and
a generator rotor position determination and tracking system, including:
  an AC power source to inject an exciter stator stimulus into the exciter stator in the form of polyphase AC power via a plurality of exciter input lines;
  a main inverter to provide a polyphase AC main stator stimulus having a main stator stimulus frequency to the main stator via a plurality of main input lines;
  a plurality of voltage sensors disposed at the exciter input lines to sense the exciter stator stimulus voltage;
  a plurality of current sensors disposed at the exciter input lines to sense an exciter stator response current, the exciter response current including harmonics related to the main stator stimulus;

a first control logic that receives the sensed exciter stator response current and exciter stimulus voltage and outputs an estimated possible generator rotor position to a starter control system; and a second control logic that provides the main stator stimulus via the starter control system and the main inverter, receives an estimated exciter stator stimulus rotating wave form angle and filtered sensed exciter stator response from the first control logic and utilizes a known main stator stimulus angle of the main stator stimulus to determine a true generator rotor position, angularly offset from the estimated possible generator rotor position as determined by the first control logic, the true generator rotor postion input into the first control logic via the starter control system for further tracking of the generator rotor position via the first control logic, the second control logic stopping operation once the true generator rotor position is input into the first control logic.

2. The system of claim 1, wherein the first control logic includes a notch filter to filter the sensed exciter response current.

3. The system of claim 1, wherein the first control logic further includes a phase lock loop operating on the sensed exciter stator stimulus voltage to determine the estimated exciter stator stimulus rotating wave form angle.

4. The system of claim 3, further comprising a Clark transformation to transform the sensed exciter stator voltage signals into $\alpha$ and $\beta$ coordinate signals prior to operation of the phase lock loop.

5. The system of claim 1, wherein the first control logic further includes a harmonic multiplier to multiply the estimated exciter stator stimulus rotating wave form angle and output a selected harmonic thereof.

6. The system of claim 5, wherein the first control logic further includes a first Park transformation utilizing the selected harmonic to transform the filtered sensed exciter stator response current into a rotating reference frame of the selected harmonic.

7. The system of claim 1, wherein the second control logic includes an input summer to add the estimated exciter stator stimulus rotating wave form angle and a main stator stimulus angle determined from the main stator stimulus frequency.

8. The system of claim 7, wherein the second control logic further includes a second Park transformation to transform the filtered sensed exciter stator response current to a rotating reference frame utilizing the sum of the estimated exciter stator stimulus rotating wave form angle and the main stator stimulus angle.

9. A method of rotor position determination and tracking for a dynamoelectric machine comprising:
 injecting a main stator stimulus into a main stator of the dynamoelectric machine via a main inverter, the main stator interactive with a main machine rotor;
 injecting a polyphase AC exciter stator stimulus into an exciter stator of the dynamoelectric machine via a plurality of exciter input lines, the exciter stator interactive with an exciter armature, the exciter armature operably connected to the main machine rotor via a generator rotor;
 sensing an exciter stator stimulus voltage via a plurality of voltage sensor disposed at the exciter input lines;
 sensing an exciter stator response current via a plurality of current sensors disposed at the exciter input lines;
 determining an estimated possibble generator rotor position via a first control logic utilizing the sensed exciter stator response current and exciter stator stimulus voltage;
 transmitting the estimated possible generator position to a starter control system;
 determining a true generator rotor position via a second control logic utilizing an estimated exciter stator stimulus rotating wave form angle and filtered exciter stator response signals from the first control logic together with a known main stator stimulus angle, the true generator rotor position angularly offset from the estimated possible generator rotor position as determined by the first control logic;
 inputting the true generator rotor position into the first control logic via the starter control system for further tracking of the generator rotor position;
 stopping injection of the main stator stimulus and operation of the second control logic after inputting the true rotor position into the first control logic.

10. The method of claim 9, further comprising filtering the sensed exciter stator response current in the first control logic via a notch filter.

11. The method of claim 9, further comprising determining the estimated exciter stator stimulus rotating wave form angle in the first control logic via a phase lock loop operating on the sensed exciter stator stimulus voltage.

12. The method of claim 11, further comprising transforming sensed exciter stator stimulus voltage into $\alpha$ and $\beta$ coordinate signals prior to operation of the phase lock loop.

13. The method of claim 12, wherein the transformation is accomplished via a Clark transformation.

14. The method of claim 9, further comprising:
 multiplying the estimated exciter stator stimulus rotating wave form angle; and
 outputting a selected harmonic thereof in the first control logic.

15. The method of claim 14, further comprising utilizing the selected harmonic to transform the filtered sensed exciter stator response current into a rotating reference frame of the selected harmonic in the first control logic.

16. The method of claim 9, further comprising summing the estimated exciter stator stimulus rotating wave form angle and a main stator stimulus angle determined from the main stator stimulus frequency in the second control logic.

17. The method of claim 16, further comprising transforming the filtered sensed exciter stator response current to a rotating reference frame utilizing the sum of the estimated exciter stator stimulus rotating wave form angle and the exciter stator stimulus angle.

18. The method of claim 17, wherein the transformation is accomplished via a Park transformation.

* * * * *